Patented Aug. 21, 1951

2,564,857

UNITED STATES PATENT OFFICE 2,564,857

SYNTHETIC RUBBER COMPOSITION CONTAINING AN OXYGENIZED UNSATURATED NITRILE

Anderson W. Ralston and Hoyt M. Corley, Chicago, Ill., assignors to Armour and Company, Chicago, Ill., a corporation of Illinois No Drawing. Application March 6, 1948, Serial No. 13,513

5 Claims. (Cl. 260—32.4)

This invention pertains to synthetic rubber compositions and processes for their preparation.

Synthetic rubber compositions are becoming of increased national and industrial importance. Some of these products have many of the properties of natural rubber and are satisfactory substitutes for natural rubber in a variety of instances. Most of the synthetic rubbers produced are from a polymerization of unsaturated hydrocarbons or from copolymerization of unsaturated hydrocarbons with other unsaturated compounds. The butadiene polymers, for example, are good starting materials for the preparation of synthetic rubber. Copolymerized butadiene-acrylonitrile is an excellent example of a material which can be used in our invention. Such polymerized materials can be milled and vulcanized in much the same manner as natural rubber.

In this specification and claims, the term "polymers" is used in its broad sense as including also co-polymers. One of the important problems which has been encountered in the synthetic rubber field is that of cold flexibility. Products made from natural rubber retain flexibility at quite low temperatures, and this property is highly important particularly where the rubber materials are exposed to atmospheric conditions. The various synthetic products have a decided tendency to become brittle at temperatures approaching 0° F., so that it is necessary to add very substantial amounts of plasticizers in order to enable them to retain their flexibility under these conditions. The development of brittleness is probably occasioned by the tendency of these products to become somewhat crystalline at low temperatures. The problem, therefore, is to develop materials which are compatible with the unvulcanized polymerized hydrocarbon materials, and which impart to the final vulcanized product the property of retaining their flexibility at low temperatures. Such materials must not only be compatible with the unvulcanized polymerized hydrocarbon mixture, but also with the vulcanized product and this requirement further complicates the problem. Furthermore the incorporation of such materials into these mixtures must not interfere with the desirable rubber-like properties of the finished product. This probably means that they must actually enter into chemical combination with the polymers during the process of curing or vulcanization.

Some of the most effective plasticizers which have been used or suggested for improving the low temperature flexibility of these synthetic compositions are dibutyl phthalate, dibutyl sebacate and triacetin. It has been found that some of these plasticizers are capable of extending the cold flexibility tests as low as —30° F. when added in amounts which do not materially reduce the other desirable properties. This, however, is not satisfactory for some purposes and it would be very desirable to extend the flexibility to much lower temperatures. Furthermore, these plasticizers are solvent extractable and this is highly undesirable if the product is used in contact with solvents for the plasticizers since the cold flexibility properties would be lost with loss of the plasticizer.

We have now discovered ways for preparing synthetic rubber compositions which have extremely good cold flexibility properties. These processes involve the incorporation within the polymerized material of a high molecular weight unsaturated nitrile which has been subjected to oxidizing treatment. For example a butadiene-acrylonitrile polymer when treated with 12% of an oxygenized cottonseed nitrile gives, when vulcanized with 2% sulfur and 2% accelerator, a product which shows a cold flexibility test of —52°. This is a substantially better cold flexibility test than could be obtained with untreated cottonseed nitriles or with other known plasticizing agents. It has been found that polymers prepared from butadiene and acrylonitrile can be incorporated with 26% of the oxygenized nitriles and still give a solid flexible product upon vulcanization. When 40% of oxygenized nitrile is added to the butadiene polymer the final product is liquid. As low as .4% may be used satisfactorily. It has been found that, for most purposes, the most satisfactory products are obtained when approximately .5 to 5.0 percent of the oxygenized nitrile is added to the butadiene polymer. In carrying out our process we may admix with the butadiene polymer, prior to the vulcanization step, the oxygenized unsaturated nitrile. The vulcanization ingredients such as sulfur, accelerator, etc., are added and the product finished in the usual manner.

The oxygenized unsaturated nitriles can be obtained by blowing unsaturated nitriles with oxygen or oxygen-containing gases at suitable elevated temperatures for a period usually of several hours. A temperature of from 50° C. to 150° C. is usually employed. Marked characteristics of the oxygenized nitriles are their reduced iodine number and lack of characteristic odor. As before stated these oxygenized nitriles possess the property of improving the cold flexibility tests of synthetic rubber-like compositions to a much greater degree than other untreated nitriles or substances such as dibutyl phthalate or other compounds now used. The synthetic rubber compositions obtained are free from objectionable odors.

The nitriles which we have found to be effective in improving the cold flexibility characteristics of rubber-like synthetics are broadly defined as any unsaturated nitrile having at least eighteen carbon atoms which has been pretreated with oxygen according to the procedures above referred to. Examples of such nitriles are oxygenized oleonitrile, linoleonitrile, linolinonitrile and other straight chain aliphatic nitriles. Nitriles from fats containing a substantial proportion of unsaturated fatty acids are also very effective, such as the nitriles from the mixed fatty acids of cottonseed oil, soybean oil, fish oils, etc. While we prefer to use only nitriles which are unsaturated, a small percentage of any saturated nitrile contained in the mixtures used will not be objectionable.

This application is a continuation in part of our co-pending application Serial No. 456,364, filed August 27, 1942, now abandoned.

Having thus described our invention, what we claim is:

1. A process for preparing a synthetic rubber composition which comprises mixing a butadiene polymer with from .5 to 26.% of an oxygenized unsaturated nitrile having at least 18 carbon atoms, and vulcanizing the resulting mixture.

2. In a process for preparing a butadiene polymer synthetic rubber composition, the step of vulcanizing a butadiene polymer in the presence of from .5 to 5.0% of an oxygenized unsaturated fatty acid nitrile having at least 18 carbon atoms.

3. A synthetic rubber composition comprising a butadiene polymer and from .5 to 26.% of an oxygenized unsaturated nitrile having at least 18 carbon atoms.

4. A synthetic rubber composition comprising a butadiene polymer and from .5 to 5.0% of an oxygenized unsaturated fatty acid nitrile having at least 18 carbon atoms.

5. A synthetic rubber composition comprising a co-polymer of butadiene and acrylonitrile and from .5 to 5.0% of an oxygenized unsaturated fatty acid nitrile having at least 18 carbon atoms.

ANDERSON W. RALSTON.
HOYT M. CORLEY.

No references cited.